Jan. 15, 1946. J. A. LUCAS 2,393,113
APPARATUS FOR TESTING GEAR UNITS
Filed April 13, 1943
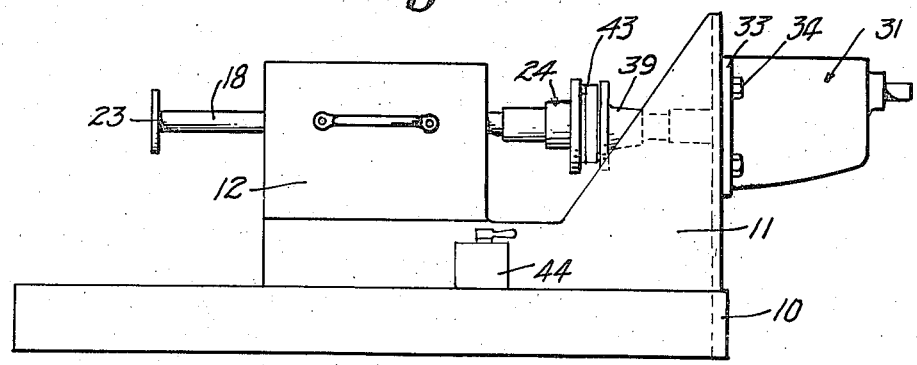
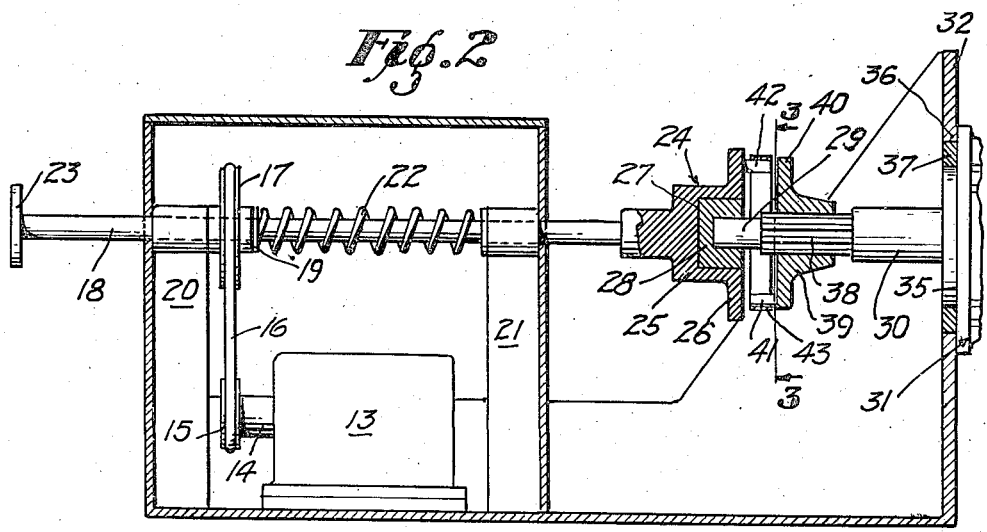
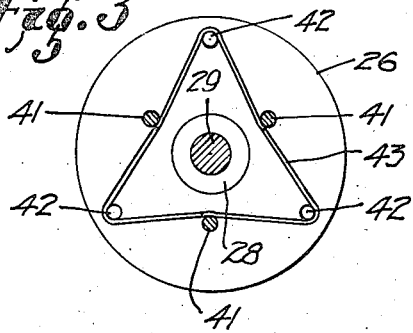
INVENTOR.
JOSEPH A. LUCAS.
BY
ATTY.

Patented Jan. 15, 1946

2,393,113

UNITED STATES PATENT OFFICE 2,393,113

APPARATUS FOR TESTING GEAR UNITS

Joseph A. Lucas, Los Angeles, Calif., assignor, by mesne assignments, to Lucas Auto Co., Los Angeles, Calif., a general partnership consisting of J. A. Lucas and L. J. Sewell Application April 13, 1943, Serial No. 482,942

4 Claims. (Cl. 73—162)

This invention relates to a testing device, and particularly pertains to an apparatus for testing gear units.

Heretofore, it has been common practice to test gears and to grind the faces of their teeth into proper surface contact so that they will not be unduly noisy in operation. This operation is known as "grinding in." This operation has in most instances involved means whereby a set of gears is mounted upon complementary mandrels in a gear testing device, after which one of the mandrels is driven so that the meshing gears can be tested for noise and can be "ground in" so that they will not be noisy. In such structures the equipment is permanent shop equipment so that it is necessary to mount the gears upon the mandrels in the testing machine, and after the gears have been tested and ground, to remove them from these shop mandrels and mount them upon the shafts of the transmission or other gear unit within which they are intended to operate. It will be obvious that under such circumstances the gears may be suitably "ground in," and the tests will indicate that the gears are not objectionably noisy. However, when the gears are removed from the shop mandrels of the testing device and they are then installed upon the shafts actually mounted within the gear set housing, where they are intended to function, the spacing of the shafts, their bearings, and the set positions of the gears on the shafts may vary sufficiently to cause the gears and their contacting faces to be out of alignment so that they will be objectionably noisy, even though in the testing machine the inspection resulted in their approval. It will be apparent, therefore, that the most efficient grinding and testing operation would take place when the gears are mounted within the gear housing within which they are intended to function and when mounted upon their own shafts carried in the bearings of the housing, thus eliminating the necessity of removing the gears and installing them upon other shafts.

It is the principal object of the present invention, therefore, to provide a gear testing device in connection with which an assembled gear unit including its housing, shafts mounted in their bearings, and the gears are assembled, the structure being designed so that gear housings of different make and size may be easily mounted upon the testing device, and so that furthermore the motive power unit for the testing device will impart rotation to a shaft of the gear unit through flexible means which will completely insulate the gear unit from the driving mechanism, so that any noise recognized in the gear unit will be noise which originated in the gear unit and was not transmitted from the driving structure.

The present invention contemplates the provision of a permanent base structure carrying a driving unit enclosed within a housing, and which unit imparts rotation to a drive shaft mounted for longitudinal adjustment with relation thereto, the base structure being also fitted with means whereby gear units having housings of different design may be accommodated and held, and whereby torque may be imparted to a shaft of the gear unit through sound insulating means.

The invention is illustrated by way of example in the accompanying drawing in which:

Figure 1 is a view in side elevation showing the testing device and indicating a gear unit operatively mounted thereon.

Fig. 2 is an enlarged view in central longitudinal section through the testing device and showing the operative relationship of the parts.

Fig. 3 is a view in transverse section through the sound insulating coupling showing the parts thereof.

Referring more particularly to the drawing, 10 indicates a base structure upon which is mounted a standard 11 and a housing 12. The housing 12 may be hinged so that it may be opened to permit access to the interior thereof. Within the housing 12 is an electric driving motor 13 fitted with a shaft 14 carrying a pulley 15. This pulley receives a belt 16 which is led around a pulley 17 mounted upon a testing drive shaft 18. The pulley 17 is splined onto the shaft as indicated at 19 so that the shaft 18 may slide longitudinally through the pulley and supporting bearings 20 and 21. A helical spring 22 is interposed between the end face of the hub of pulley 17 and the face of bearing 21 in order to maintain the pulley 17 in alignment with pulley 15 when the shaft 18 is moved for longitudinal adjustment. On the outer end of the shaft 18 is a circular hand wheel or disc 23 by which the shaft may be longitudinally adjusted. Upon the opposite end is a coupling head 24 which is keyed to or formed integral with the shaft 18. This head includes a cylindrical portion 25 at the forward edge of which an enlarged disc 26 is formed. Within the head 24 is a recess 27 to receive interchangeable bushings 28. The bushings are provided to accommodate the end 29 of a shaft 30 which is mounted within bearings in the housing of a gear unit 31. The gear unit 31 contains the gears to be tested and is detachably secured to the end plate 32 of the support standard 11.

The housings of gear units, such as those to be tested, are usually provided with a bolting flange 33 by which they are assembled with other mechanism, but which flange is here provided to receive cap screws 34, by which the unit is fastened to the end of the standard 11. It also often occurs that a cylindrical portion 35 projects beyond the bolting flange 33 of the housing to seat within a housing unit with which the gear unit is assembled. The diameters of the portions 35 may vary and in order to accommodate them in the present device an opening 36 is formed through the end plate 32 of the standard 11 and may receive filler rings 37 to properly center the housing of the gear unit 31 so that its shaft 30 will be in longitudinal alignment with the shaft 18.

It is common practice for the shaft 30 of various gear units to be formed with a splined section, as indicated at 38. This splined section is here shown as receiving a removable coupling head 39 complementary to the previously mentioned coupling head 24 on the shaft 18. The removable coupling head 39 has a circular disc 40 contiguous to the disc 26 of the coupling head 24 and spaced therefrom. Projecting from the end face of the disc 40 is a plurality of pins 41, here shown as being three in number. These pins are spaced equidistant along a circle concentric with the rotating axis of the shafts 18 and 30. The disc 26 of the coupling head 24 carries a plurality of pins 42. These are equidistant from each other along a circle concentric with the rotating axis of the shafts, the circle being of larger diameter than that along which the pins 41 are spaced. Woven around the outside of the coupling pins 42 and the inside of the coupling pins 41 is a nonmetallic band 43, preferably made of rubber, such as a rubber belt. Thus, rotation of the coupling head 24 will impart movement to the pins 42 and movement will then be imparted to the coupling head 39 through the pins 41. It has been found that by this arrangement a driving action is produced while insulating the gear unit 31 from any noise which might otherwise be transmitted from the driving motor 13 and the pulleys 15 and 17 to the gear structure being tested. It will also be evident that by imparting a driving motion through the resilient member 43 a yieldable drive will be provided so that the teeth of the gears will not be forced against each other with an unyielding action, thus making it possible to grind the gears more thoroughly and to detect the slightest noise produced by the improper contact of the gear faces.

In operation of the present invention, the gear unit 31, which is to be tested, is fastened onto the plate 32 of the standard 11 by cap screws 34. The removable coupling head 39 is then fitted onto the end of shaft 30 of the gear unit 31. It will of course be understood that the shaft 30 on various gear units may be differently formed, and that the removable head 39 will be adapted to serve the purpose here shown. A bushing 28 is then selected and placed within the seat 27 of the coupling head 24 to accommodate the end portion 29 of the shaft 30 and to center it. It will also be understood that a suitable filler ring 37 is fitted within the opening 36 of the plate 32 and around the cylindrical extension of the gear unit housing. The flexible driving member 43 is then positioned with relation to the pins 41 and 42, as shown in Fig. 3 of the drawing. The shaft 18 is moved longitudinally to bring the coupling head 24 into the position shown in Fig. 2 of the drawing. It is understood that since the pulley 17 is splined onto the shaft 18 the spring 22 will hold the pulley 17 against the bearing structure 20 and in alignment with the driving pulley 15 irrespective of the longitudinally adjusted position of the shaft 18. In actual practice it has not been found necessary to set the shaft 18 in any adjusted position, since the yieldable driving member 43 tends to hold the couplings in driving relationship to each other. It is obvious, however, that means acting to limit longitudinal movement of the shaft 18 might be provided without involving invention.

After the coupling heads 24 and 39 have been set with relation to each other, the housing 12 may be closed around the motor 13 and the drive shaft 18 with its pulleys, so that any noise developed in the driving structure will be silenced to permit testing of the gear unit 31. The motor 13 may be connected in any suitable way to a source of power supply, although it is preferable to control the source of supply by a reversing switch 44 which will permit the motor 13 to drive the gears in alternate directions, so that both sides of the gear teeth will be properly meshed and "ground in." It will be understood that the operation of grinding the surfaces of meshing gear teeth is performed along lines of standard practice by lapping the teeth and by using grinding compounds which act between the surfaces of the teeth to grind them into proper mesh. It will be understood that the condition which causes a set of gears to be noisy is one in which the teeth do not properly mesh and in which there is not a line surface contact between the abutting faces of the meshing teeth. The elimination of noise, therefore, in connection with the testing operation, as here described, consists in proper adjustment of the gears on their shafts and the driving of the gears together with a cutting compound upon them, which will tend to lap the surfaces of the gears and smooth the surfaces of abutting faces against each other so that a maximum contact will be obtained. In some instances, where it is required that the gears mesh precisely, the noise generated by the gears may be studied by the aid of a stethoscope.

It will thus be seen that the apparatus here disclosed insures that gear sets which have not been placed in use and gear sets which have been used but must be reconditioned, may be quickly tested for noise and thoroughly "ground in," so that when the gear unit is removed from the testing device it will be in condition for installation in an intended setting and will thus remain in adjustment. It will also be evident that the present invention has particular value in salvaging gear sets which have been used, and which by this method may be reconditioned so that they will provide many hours of additional performance without requiring the use of new replacement parts.

While I have shown the preferred form of my apparatus, it is to be understood that various changes might be made in the combination, construction and arrangement of the parts of the apparatus by those skilled in the art without departing from the spirit of the invention as claimed.

Having thus described my invention, what I claim and desire to secure by Letters Patent is:

1. A gear testing device, including a driving unit, a fixed standard to which an assembled gear unit may be temporarily fastened, a coupling head to be mounted on a shaft of said gear unit, a coupling head associated with the driving unit, the two coupling heads being disposed in axial alignment, connecting means between said coupling heads whereby rotary motion may be imparted from the driving unit to the shaft of a gear unit, and interchangeable bushings adapted to be mounted within the end of the driving coupling head to receive and center the end of the shaft on which the driven coupling head is mounted, said connecting means comprising pins on said heads and a flexible resilient means connecting said pins.

2. A device for testing assembled gear units, which includes a housing within which shafts carrying meshing gears are mounted and which housing has a cylindrical boss extending from an end face thereof and centrally of which a shaft projects, said testing device including a base, a standard thereon having an opening therethrough to receive said housing boss and to the face of which standard the housing is secured, interchangeable filler rings adapted to fit around said boss and fill the opening in the standard to center the shaft, a driven coupling head carried upon said shaft and through which the shaft projects, a driving coupling head in longitudinal alignment therewith and having a pocket in its end face, removable bushings adapted to be placed in said pocket and having a central recess to accommodate and center the projecting end of the shaft, a drive shaft at the end of which said driving coupling head is carried, bearings through which said shaft extends and by which the shaft is rotatably supported and through which the shaft may move longitudinally, a pulley splined onto said shaft, yieldable means holding said pulley in a fixed position irrespective of the longitudinal adjustment of the shaft, a driving motor, a pulley carried on the shaft thereof, a belt passing around the motor pulley and the shaft pulley, and flexible resilient means interposed between the driving coupling head and the driven coupling head for imparting motion from one to the other.

3. A device for testing and grinding in the gears in a gear unit in their assembled normal operating setting including a driving unit having a driving shaft, a fixed standard spaced from the driving unit, means for detachably securing an assembled gear unit to the standard in position for grinding in the gears of said gear unit, one of the shafts of the gear unit projecting into the space between the standard and the driving unit and arranged in axial alignment with said driving shaft, a coupling head associated with the shaft of the driving unit, a coupling head removably mounted on the projecting shaft of the gear unit, the two coupling heads being disposed in axial alignment, connecting means between said coupling heads whereby rotary motion may be imparted from the driving shaft to said shaft of the gear unit, and means for longitudinally adjusting the coupling heads with relation to each other, whereby gear units having shafts of varying lengths may be coupled to the shaft of the driving unit.

4. A device for testing and grinding in the gears in a gear unit in their assembled normal operating setting including a driving unit having a driving shaft having a recess, a fixed standard spaced from the driving unit and provided with an opening, means for detachably securing an assembled gear unit to the exterior of said standard with one of its shafts projecting through the opening in said standard into the space between the same and the driving unit, a bushing arranged in the recess of said coupling head and receiving and supporting the terminal portion of the projecting shaft of the gear unit, the two coupling heads being disposed in axial alignment, connecting means between said coupling heads whereby rotary motion may be imparted from the driving unit to said shaft of the gear unit, said coupling means comprising pins on said heads and a flexible resilient means connecting said pins, and a filler ring arranged in the opening of the standard and supporting the projecting shaft of the gear unit.

JOSEPH A. LUCAS.